(No Model.) 2 Sheets—Sheet 2.

A. G. BURKHARDT & G. SCHÜLE.
APPARATUS FOR DISTILLING AND RECTIFYING.

No. 508,913. Patented Nov. 21, 1893.

Witnesses
Inventors
A. G. Burkhardt
Gotthilf Schüle
By E. B. Clark
Atty.

UNITED STATES PATENT OFFICE.

AUGUST GOTTLOB BURKHARDT, OF STUTTGART, AND GOTTHILF SCHÜLE, OF HOHENHEIM, GERMANY.

APPARATUS FOR DISTILLING AND RECTIFYING.

SPECIFICATION forming part of Letters Patent No. 508,913, dated November 21, 1893.

Application filed March 2, 1891. Serial No. 383,513. (No model.)

*To all whom it may concern:*

Be it known that we, AUGUST GOTTLOB BURKHARDT, engineer, of Archivstrasse, 19, Stuttgart, and GOTTHILF SCHÜLE, chemist, of Hohenheim, in the Empire of Germany, have invented new and useful Apparatus for Distilling and Rectifying, of which the following is a specification, reference being had therein to the accompanying drawings.

This invention relates to a continuous distilling and rectifying apparatus which is simple in construction and effective in operation, and wherein the operations of distilling, rectifying and deflegmating may be conducted in the same space or chamber.

The following is a description of this invention, in which—

Figure 1:
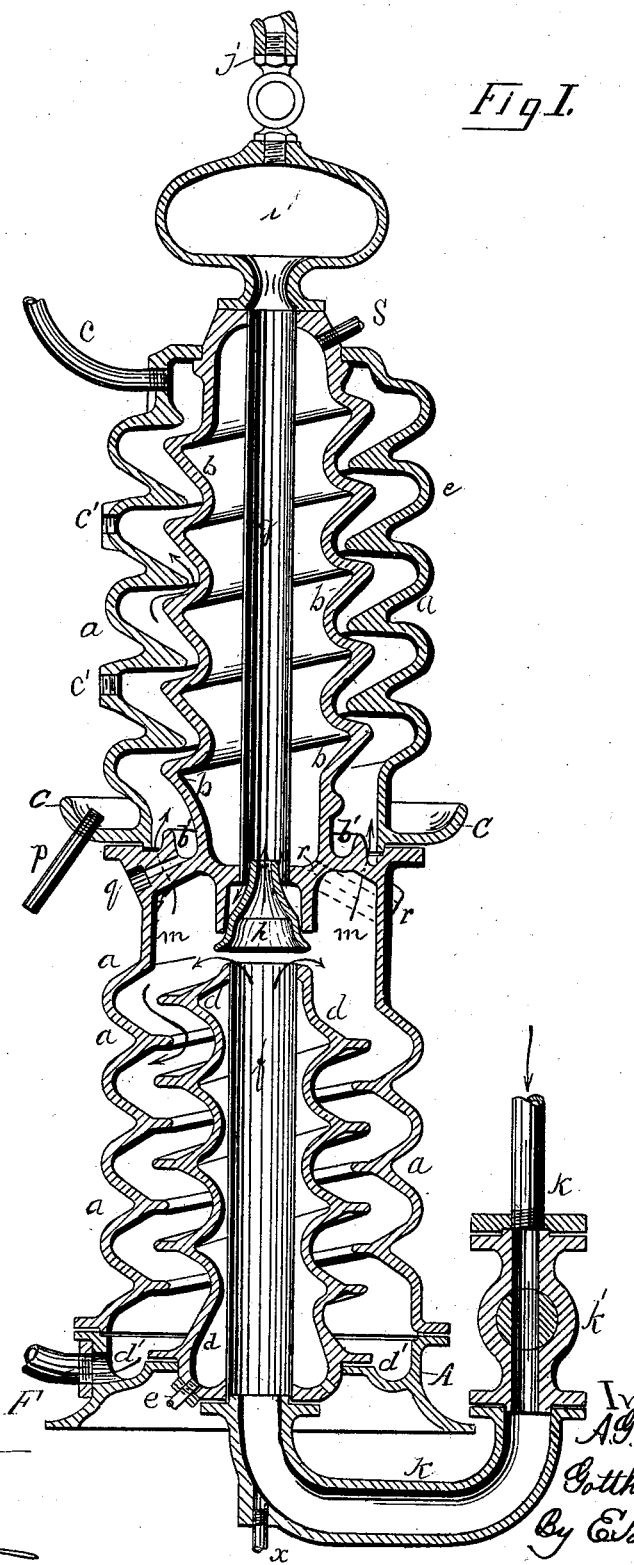
Figure 2:
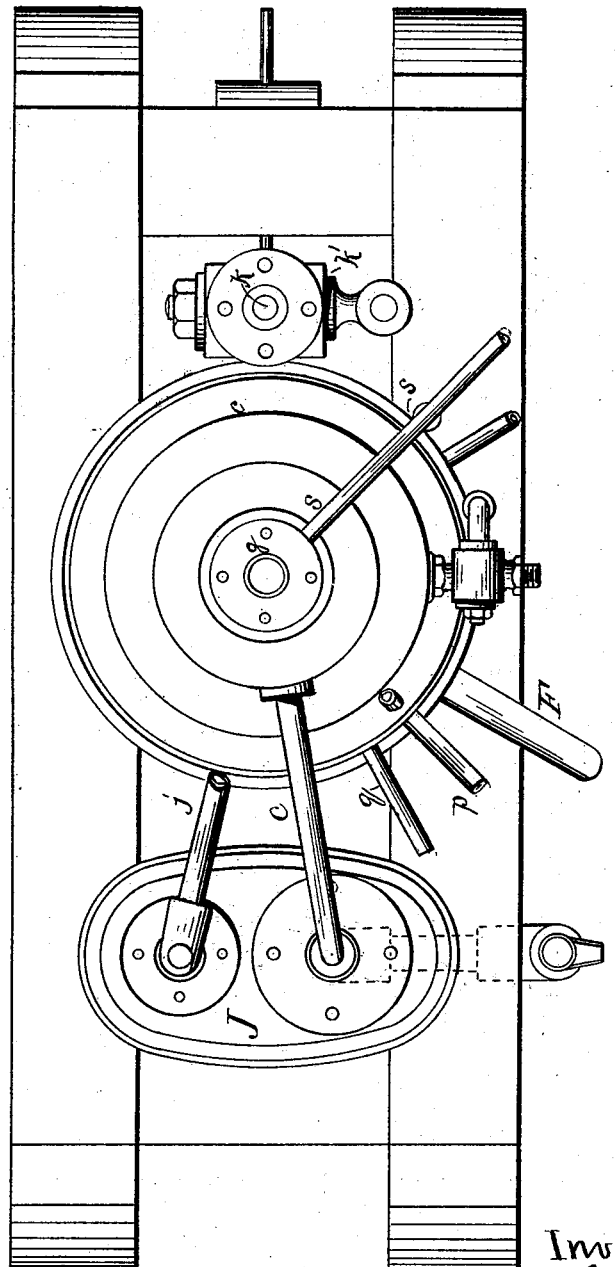

Figure 1 is a sectional elevation and Fig. 2 a plan of a distilling and rectifying apparatus according to our invention.

The apparatus comprises hollow bodies $b$ and $d$ which constitute the main working surface. These bodies $b$ and $d$ are formed in the shape of a screw so that they can be screwed into the outer parts or shells $a$ which are also in the form of a screw, and when so screwed together a spiral duct is formed between the walls of the outer and inner parts. The advantages of this screw form are that the parts can be readily placed together and luted, and an extended, effective working surface is formed at comparatively small expense. Inside the parts $b$ and $d$ are provided with pipes $g$ and $f$, which are properly secured at top and bottom, and the space between the said pipes and the walls of the parts $b$ and $d$, being supplied with steam, form steam jackets to said pipes. The liquid supply pipe $k$, provided with a cock $k'$, connects with the lower end of pipe $f$.

The shell $a$ and inner steam heated body $d$ are suitably supported upon a base A, to which they are luted or otherwise connected to make tight joints. The upper part of shell $a$, surrounding the steam heated body $b$, is detachably connected and supported by the lower shell and is provided at the bottom with an annular trough C, with which connects a drain pipe $p$. The base A, is provided with an annular channel $d'$, with which connects a pipe F, for drawing off the spent wash. The body $b$, is provided at its lower end and at its outer surface with a channel $b'$, from which leads a duct $q$ out through outer shell $a$, for drawing off phlegm which may accumulate in the upper part of the distilling and rectifying column. A duct $r$ leads from the interior of body $d$, for drawing off water of condensation, and a duct $e$, leads from the interior of body $d$, for a like purpose. Steam or other fluid is supplied to the interior of body $b$ by pipe S, and steam is also supplied to the interior of body $d$ by a pipe not shown. An escape pipe $c$, for alcoholic or other vapor connects with the zig-zag space between shell $a$ and body $b$, and leads to a cooler J. Other vapor pipes may be connected with the ports $c'$ in shell $a$.

The liquid to be distilled passes from the pipe $k$ into the heating pipe $f$, which is steam jacketed. A steam-jet $x$, is provided in the pipe $k$, which carries off up through the pipe $f$ the most volatile constituents of the liquid which pass up through the inverted funnel $h$, into the pipe $g$ and thence into the deflecting vessel or part $i$. The liquid condensed in the part $i$ returns through the hot pipe $g$ and gives off further volatile constituents and passes over the inverted funnel $h$, into the space $m$, where it is again subjected to distillation by contact with the steam heated body $d$. The first or most easily volatilized products are conducted from the vessel $i$, through pipe $j$, to a cooler J. As the liquid rises in the pipe $f$, it passes over the lip thereof at the top into the space between the parts $d$ and $a$, flowing over the zig-zag portions or spiral wall of steam heated body $d$ in the course of distillation.

The heating of the liquid is effected either by a steam coil or by the steam heated body $d$, or by both.

The vapors given off on their way upward pass in a zig-zag direction over the surface of the body $d$, and through the liquid into the space $m$ from which they pass into the second or upper part of the apparatus and over the zig-zag surface thereof. If, as shown in the drawings, the apparatus is arranged in two parts one over the other, then the products of distillation pass through openings $l$ connecting the spiral duct of one part with the spiral duct of the other.

The spiral surface of the outer part $a$, serves as a cooling surface and the surface of the inner body serves as a heating surface. The vapors condensed on the spiral walls $a$ of the apparatus and the products of condensation run into the grooves of the spiral heating body $b$, and slowly down the same whereby the more easily volatilized parts evaporate and the phlegm runs toward the lower part and is collected in a gutter or channel $b'$ whence it can be drawn off through a duct $q$. The vapors pass out through pipe $c$ to the cooler $J$. This operation of condensation and re-evaporation repeats itself from spiral groove to spiral groove until the product of condensation has acquired the desired concentration and can be drawn away to the cooling vessel.

A main feature of this invention is that the apparatus provides for the distillation and rectification being carried on or effected in one and the same space or chamber.

The interior pipe $f$, serves to heat the inflowing liquor before it passes onto the zigzag working or distilling surface of the body $d$, and the interior pipe $g$, serves to heat and redistill the liquid which flows down from part or dome $i$.

What we claim, and desire to secure by Letters Patent of the United States, is—

1. In a distilling and rectifying apparatus an inner body having a spirally corrugated surface, an outer spirally corrugated body inclosing the same forming a tortuous channel, an open ended pipe having its ends secured in the ends of the inner body forming a closed steam space around said pipe, steam pipes leading to said steam space, a supply pipe connecting with the lower end of the tube and an outlet pipe from the upper portion of the tortuous channel for the vapors and an outlet pipe from the lower portion, substantially as described.

2. In a distilling and rectifying apparatus a spirally corrugated inner body, an open ended pipe having its ends secured in the ends of the inner body forming a closed steam space, steam pipes leading to said steam space, an outer spirally corrugated body surrounding the inner body, an upper spirally corrugated body mounted upon the lower outer part, an open ended pipe having its ends secured in the ends of the same forming an upper steam space, steam pipes leading thereto, a deflecting vessel located upon the upper end of the upper pipe, an outer corrugated part inclosing the upper inner part forming an upper tortuous channel, passageways connecting the two tortuous channels, outlet pipes connected with the upper and lower tortuous channels, and a supply pipe connecting with the lower pipe, substantially as described.

3. In combination with the base having a central opening and annular channel $d'$, an inner spirally corrugated body mounted thereon, an open ended tube having its ends secured to the ends of the inner body forming a steam space, steam pipes connecting therewith, an outer corrugated body inclosing the inner body forming a tortuous channel said outer body having an upper spirally corrugated body mounted thereon with an annular channel at its base, an open ended pipe having its ends secured in the ends of said upper body, an outer upper body mounted upon the lower body and inclosing the upper forming an upper tortuous channel, passageways connecting the tortuous channels, outlet pipes connecting the annular channels, a supply pipe connected to the lower open end pipe and a deflecting vessel located above the upper open end pipe, substantially as described.

In witness whereof we have hereunto set our hands in presence of two witnesses.

AUGUST GOTTLOB BURKHARDT.
GOTTHILF SCHÜLE.

Witnesses:
EUGEN TAMBERG,
ERNEST LIEHR.